United States Patent [19]

Wyman et al.

[11] Patent Number: 5,215,822

[45] Date of Patent: Jun. 1, 1993

[54] METHOD OF IMBUING ORGANIC POLYMER FILMS WITH IMPROVED GAS IMPERMEABILITY CHARACTERISTICS AND IMPROVED BARRIER COATINGS THEREFOR

[75] Inventors: John E. Wyman, Westford; Imtiaz Rangwalla, North Andover, both of Mass.

[73] Assignees: Energy Sciences, Inc., Wilmington; Marjorie T. Wyman, Westford, both of Mass.

[21] Appl. No.: 663,666

[22] Filed: Mar. 1, 1991

[51] Int. Cl.⁵ .......................... B32B 9/04; B05D 3/06; C08G 77/04; C08G 77/00

[52] U.S. Cl. .................... 428/447; 428/448; 427/503; 528/26; 528/32; 528/38; 528/43

[58] Field of Search ................. 428/447, 448; 427/44; 528/26

[56] References Cited

U.S. PATENT DOCUMENTS 4,803,126   2/1989   Wyman ............................ 428/447

*Primary Examiner*—George F. Lesmes
*Assistant Examiner*—Chris Raimund
*Attorney, Agent, or Firm*—Rines and Rines; Shapiro and Shapiro

[57] ABSTRACT

This invention embraces a method of controlling the impermeability of an organic polymer film to gases such as oxygen, aroma, flavor and fragrance and the like to produce gas impermeable organic polymer films by coating with a mixture of a siloxane monomer with carboxylic acid in an alcohol solvent and evaporating the solvent to complete the formation of Si—O—Si bonds; and then polymerizing and grafting the coating, preferably by electron beam radiation, to the polymer film. Improved coated polymer films and formulation products therefor are also provided.

32 Claims, No Drawings

METHOD OF IMBUING ORGANIC POLYMER FILMS WITH IMPROVED GAS IMPERMEABILITY CHARACTERISTICS AND IMPROVED BARRIER COATINGS THEREFOR

The present invention relates to new and improved barrier coatings for organic polymer films such as polyethylene, polypropylene and polyester films and the like, and the methods of preparing the same, wherein the coated films become imbued with reduced permeability to gases such as oxygen, air and carbon dioxide, as well as to greases and oils and the like; the invention also relating to such film coatings for receiving further barrier layers thereupon.

BACKGROUND

The advantageous use of silane polymer materials, preferably electron-beam grafted to polyolefin and other polymer films, as for such purposes as bonding with barrier layers, has been described in earlier U.S. Pat. No. 4,803,126, of common assignees with the present invention. In copending patent applications Ser. Nos. 336,848 now U.S. Pat. No. 5,077,135, filed Apr. 12, 1989, and 557,521 filed Jul. 24, 1990, of said common assignees, furthermore, there was reported the discovery that appropriate polysiloxane coatings applied upon such polymer film surfaces as polyethylene, polypropylene and the like, can provide for greatly decreased permeability in the films to such gases and oils and greases, and with preferred grafting of the coatings to the film surface with the aid of electron beam radiation techniques. Such techniques provide food packaging materials, for example, of polysiloxane polymer-coated films having improved gas impermeability, reduced aroma and flavor transmission properties and improved surface appearance and clarity, as described in said copending applications.

It is well known to those skilled in this art that to achieve strong adhesive bonds to the surface of polymers, polyolefins, such as polyethylene, polypropylene and the like, the film surface may be corona treated. It is believed that such corona treatment not only removes oils, greases and impurities from the surface of the film but, in addition, often causes oxidation of the surface, introducing carboxyl and carboxylic acid groups. In the previously mentioned patent and patent applications, it was shown that the coating of the polyolefin films with certain silanes, such as a vinyl benzylamine siloxane (Dow Corning Z6032), produces a coated surface that, following treatment of the coating with the electron beam, allows for greatly improved adhesion both to the surface of the polyolefin film and to adhesives. In the above-mentioned patent and patent applications, a process is described wherein, for example, Dow Corning Z6032 siloxane is dissolved in alcohol, hydrolyzed by the addition of water, and allowed to equilibrate into stable structures over a 12-24 hour period. The corona-treated polymer film (corona-treated primarily to remove grease, oil and dirt) is then treated with this alcohol solution and the alcohol solution is dried. It is believed that the resulting coating polymerizes to a somewhat cross-linked structure wherein the vinyl benzyl groups are at the interface between the polymer surface and the siloxane coating and additionally at the interface between the siloxane coating and air.

In the above-mentioned patent, we showed that prior to treating with electron beam irradiation, the siloxane coating can be treated with other unsaturated materials such as acrylated urethane adhesives and the like, and that the electron beam treatment then grafts the siloxane coating to the polyolefin film and additionally polymerizes and grafts the acrylated urethane coating to the siloxane. This process produces adhesive bonds with much greater strength than could be achieved be merely treating the corona-treated polyolefin film with conventional adhesives.

It has also been demonstrated that some of these unsaturated materials may be included with the hydrolyzed siloxane solution. For example, we have shown that the addition of monomeric acrylamide to the siloxane solution produces, after coating and drying and subjecting to electron beam treatment, a polyolefin article which has polyacrylamide grafted to it. This polyacrylamide coating is extremely hydrophilic and produces a polyolefin article which is very easily lubricated by water.

Similarly, and perhaps most importantly, we have now found that the addition of appropriate organic acids, and in particular unsaturated carboxylic acids, to the siloxane solution prior to coating of the polyolefin or other polymer film results in a coating in which we have deliberately introduced additional carboxylic acid groups at the air-coating interface. The advantage of this process is that many more carboxyl groups are introduced on the surface or at the air interface than can be achieved by simple corona treatment of the polyolefin or other polymer film itself. This is indicated by the fact that while the critical surface tension of a corona-treated polyolefin film is in the range of 35-40 dynes per centimeter, the coatings of the present invention in which we include such carboxylic acids have critical surface tensions well in excess of 60 dynes per centimeter.

It is known that the adhesion of evaporated metal layers such as aluminum to polyolefin film surfaces is greatly improved when the surface of the film is corona treated. Similarly, barrier polymer materials such as, for example, polyvinylidine dichloride applied in the form of a latex show improved wettability and adhesion on corona-treated films, compared with the non-corona-treated films, as described, for example, in the above-referenced patent. It is the purpose of our invention, therefore, to deliberately supply to the surface of the coated film many more carboxylic acid groups than can be achieved by simple corona treatment of a polyolefin or other polymer film, greatly improving the wetting and adhesion of all coatings, either organic or inorganic, applied to the surface of these films.

Altogether apart from such improved wettability and adhesion properties, however, it has also been discovered that the addition of unsaturated carboxylic acid to the siloxane monomer prior to coating on the polymer film has resulted, after polymerization and grafting to the polymer film, particularly by electron beam radiation, in a startlingly improved oxygen, gas, aroma, flavor and fragrance impermeability of the coated film.

Although both saturated and unsaturated carboxylic acids may be employed in the practice of this invention, unsaturated acids such as maleic acid, fumaric acid, citraconic acid and itaconic acid, among the carboxylic acids, are preferred because, under the influence of the electron beam radiation, they polymerize and graft to the siloxane coating, rendering these acids non-migrating in the presence of moisture or heat, and producing, surprisingly and unexpectedly, a very substantial improvement in the oxygen impermeability for the oxygen barrier properties of the siloxane film.

OBJECTS OF INVENTION

An object of the present invention, accordingly, is to provide a new and improved method of increasing and indeed controlling the impermeability of organic polymer films to gases such as oxygen, aroma, flavor and fragrance and the like.

Another object of the invention, is to provide such control and increase in the gas impermeability of organic polymer films through the mixing of a siloxane monomer coating for the film with preferably an unsaturated carboxylic acid, or the like, to produce vastly improved gas impermeability characteristics to the film following polymerization and grafting of the coating thereto.

A further object is to provide for controlling the degree of impermeability of such coated films by the degree of usage of such carboxylic acids and the like.

Still another object is to provide a novel method of increasing and controlling the surface tension, bonding strength and wettability of such polymer films, including their particular adaption for receiving and adhering barrier coating layers.

An additional object is to provide novel coated polymer films having improved gas-impermeable and/or surface tension-wettable-bonding characteristics.

Other and further objects will be described hereinafter and are more particularly delineated in the appended claims.

SUMMARY

In summary, from one of its broader viewpoints, the invention embraces a method of controlling the impermeability of an organic polymer film to gases such as oxygen, aroma, flavor and fragrance and the like, that comprises, mixing a siloxane monomer with carboxylic acid in a solvent and solubilizing, hydrolyzing and equilibrating the solution; coating the solution upon the polymer film; evaporating the solvent to complete the formation of Si—O—Si bonds; and polymerizing and grafting the siloxane and carboxylic acid to the film, preferably radiation-induced polymerization as by electron beam radiation or the like.

As before stated, the invention also embraces increasing the polymer film surface tension, bonding strength and wettability and adaptability for receiving barrier layers through the above technique. Preferred and best mode techniques and formulations are hereinafter described as well as novel coated polymer films produced by the methods underlying the invention.

DESCRIPTION OF INVENTION

It is believed conducive to an understanding of the effect underlying the present invention of mixing preferably unsaturated carboxylic acid(s) with the siloxane monomer prior to coating the organic polymer film, to contrast the oxygen permeability characteristics of the invention from that obtained with uncoated films and those of said copending applications. For this purpose, reference will first be made to the use of added fumaric acid.

EXAMPLE 1

The siloxane coating containing about 17% by volume fumaric acid (based on the volume of the siloxane) was prepared by the following method. A quantity of 50 milliliters of Z6032 solution as received from Dow Corning Corporation, 42.5 ml of methanol and 7.5 ml of water was prepared. The mixture was allowed to stand 12 hours to complete hydrolysis, equilibration and polymerization into oligomers. Prior to coating on low density polyethylene (LDPE) film, a quantity of fumaric acid equivalent to about 17% of the volume of the siloxane, a quantity of 5.6 g of fumaric acid, was added to the solution and stirred and heated to cause it to dissolve. The coating was applied to corona-treated film by immersing the film in the solution, then allowing it to drain and air dry. The rate of the condensation polymerization of the siloxane oligomers and the low molecular weight polymers was increased by the presence of the fumaric acid. It was observed that the film dried much more rapidly when it contained the fumaric acid, compared with the equivalent coating which did not contain fumaric acid, the rate of condensation of silanols to form Si—O—Si bonds being acid catalyzed. The polymerization and grafting of the fumaric acid to the siloxane and the siloxane to the polyolefin film was accomplished by electron beam irradiation, 5 Megarads at 175 kilovolts using Energy Sciences Inc. CB200/75/300 equipment.

As previously noted in the before-mentioned U.S. Pat. No. 4,803,126, the surface of polymers such as polyolefins and the like was found to be improved in terms of wettability by barrier and other coatings and to enhance interlayer adhesion by graft polymerization through initiation by radiation, preferably electron beam radiation. In that patent, the polyolefin or other polymer films were primed with a silane polymer material and electron beam irradiated, it being pointed out that the irradiation appeared to generate free radicals from the film that in turn initiated further polymerization of the silane and grafted the same to the film surface. The process was described as having been found to increase the surface tension of the film surface, rendering the same compatible for strong bonding with barrier materials, such as acrylonitrile and similar monomers for producing further layers on the film substrate.

We have now found that the siloxane coating containing the carboxylic acid also provides superior adhesion of barrier polymers compared with just corona-treated film, and in fact the presence of the carboxylic groups on the surface provides higher critical surface tension and improve the wetting of the polymer surface by polymer latices, such as a polyvinylidine dichloride latex or a polyvinylacetate latex.

Clearly other organic or inorganic barrier layers may also be applied, taking advantage of this increased surface tension and thus adhesion properties, apparently created by the increased number of carboxylic groups created by the modified siloxane. This has enabled metals, such as aluminum, to be strongly adherable onto the surface of the polyolefin or other film, as set forth later in Example 16.

A 125-micron thick, low density polyethylene film (LDPE), for example, has an oxygen permeability of about 2500 cc of oxygen per square meter per 24 hours. A Dow-Corning type Z6032 siloxane coating grafted to the surface, as taught in the said copending applications, greatly reduces the oxygen permeability at 0% relative humidity to about 30 cc per square meter per 24 hours. Surprisingly and unexpectedly, however, we have now found that the addition of a quantity of fumaric acid, preferably equivalent to about 17-22% by volume of the siloxane film, further reduces the oxygen permeability at 0% relative humidity to less than about 2 cc of oxygen per square meter per 24 hours after the electron beam grafting.

A further, completely unexpected result of the addition of this quantity of fumaric acid to the coating is the reduction of the oxygen permeability at higher relative humidities, such as in the range of 70-80% relative humidity. The oxygen permeability of the siloxane coating, which is the subject of the previous inventions in said copending applications, at 70-80% relative humidity increased from 30 cc per square meter per 24 hours at 0% relative humidity to 550 cc of oxygen per square meter per 24 hours at 70-80% relative humidity. The addition of the fumaric acid in the quantity described above was found, after electron beam grafting, to reduce the permeability at 70-80% relative humidity to less than about 50 cc of oxygen per square meter per 24 hours.

The above-reported oxygen permeability of the coated films, both under "dry" and "wet" conditions, was measured using an Oxtran Model 100-A, made by Modern Controls Inc.

While it is not necessary fully to understand the physical and chemical mechanisms of why these novel results are attained, it being sufficient to describe the necessary and sufficient conditions for practicing and obtaining the new results of the invention, and without wishing to be bound to particular theories, it is believed that this remarkable improvement is attained for the following theoretical reasons. The improved permeability at 0% relative humidity is believed to be achieved by the improved wetting of the coating containing the fumaric acid or other carboxylic acid, as later described. It is thought that the decreased oxygen permeability is caused by the fact that the coating solution wicks into the pores of the polyolefin or other polymer film; and, following drying and treatment with electron beam radiation, the siloxane coating plugs the pores and reduces the free volume through which oxygen can permeate.

It was, however, unexpected to find that the oxygen permeability at higher relative humidities was decreased by the addition of a hydrophilic material such as the fumaric acid or other carboxylic acid as later described. This would have been contraindicated by previous experience with hydrophilic polymers, such as, for example, polyvinyl alcohol, wherein absorption of moisture appears to cause the polymer film to swell, increasing the free volume and greatly increasing the oxygen permeability. It is possible that the electron beam radiation induces polymerization of the fumaric acid and grafting to the siloxane, thereby preventing the structure from such swelling even should the modified coating attempt to absorb moisture. Because of the cross-linking of the siloxane layer by the polymerization of the fumaric acid, moreover, swelling of the modified polysiloxane coating is prevented.

The modified Z6032 silane containing the fumaric acid, even though, as before-mentioned the fumaric acid is hydrophylic, has been found to cross-link after electron-beam irradiation to an extent that even if it or the amine hydrogen salt in the Z6032 absorbed moisture, it is cross-linked to an extent where it essentially prevents the swelling, and therefore there is no increase in the free volume and a decreased wet oxygen permeability results.

EXAMPLE 2

Fumaric acid has proven useful in the practice of this invention when it is added in amounts ranging from about 3% of the volume of Z6032, for example, up to its solubility limit in the hydrolyzed dried film. This was found to be about 22% by volume of the siloxane film or a quantity of 7.3 g of fumaric acid added to a solution prepared using 50 cc of Dow Corning Corp. Z6032 solution as received, 42.5 cc of methyl alcohol, and 7.5 cc of water. When the quantity of fumaric acid added to the siloxane film exceeds the solubility limit (for example, when added in a quantity in excess of the 7.3 g in the above described solution), the dried and electron beam-treated film shows the inclusion of small crystallites, presumably of fumaric acid. The fumaric acid which has been added in excess of the solubility crystallizes out and not only degrades the appearance of the film, but also degrades the oxygen barrier properties.

Specifically, as mentioned, about 7.3 g of fumaric acid is the solubility limit of fumaric acid in the siloxane film resulting from the coating composition described above and results in an oxygen permeability at 0% relative humidity of 0.4 cc per square meter in 24 hours and, at about 70-80% relative humidity, gives an oxygen permeability of 24.0 cc per square meter in 24 hours when the siloxane/fumaric acid solution is coated on 125 micron LDPE film. By increasing the fumaric acid by adding 8.2 g of fumaric acid to a solution consisting of 50 cc of as-received Z6032, 42.5cc methanol and 7.5 cc of water, the film, as before stated, deteriorated in its appearance and also in the dry oxygen permeability. The oxygen permeability at 0% relative humidity was then found to be 8.0 cc oxygen per square meter in 24 hours and the permeability at about 70-80% relative humidity, increased to about 51 cc of oxygen per square meter in 24 hours.

In addition, the electron beam-treated film containing the excess fumaric acid which shows up in the form of crystallites, becomes frosted following the determination of oxygen permeability at about 70-80% relative humidity. It is believed that the fumaric acid existing in the crystallites is not grafted to and incorporated into the siloxane layer, and is thus free to migrate to the surface in the presence of the moisture where it then crystallizes and frosts the surface of the film.

In contrast to these results, films containing fumaric acid in quantities not exceeding the solubility limit are very clear and transparent. Further, there is no change in appearance of the film following determination of oxygen permeability at the higher relative humidities, such as about 70-80%. This further indicates that the fumaric acid in solution in the proper proportions dissolves in the silane polymer, and under the influence of electron beam radiation polymerizes and grafts to the polymer and becomes immobile.

In some instances, the siloxane coatings containing added fumaric acid, after treatment with the electron beam to polymerize the fumaric acid and graft it to the siloxane and graft the siloxane polymer to the film surface, were more brittle than the coating utilizing the siloxane alone grafted to the film surface. It was found that the addition of a free radical initiator, such as benzyl or dicumyl peroxide, to the coating composition before coating, drying, and subjecting the coated film to electron beam radiation decreased the apparent brittleness of the siloxane coating, as will now be described.

EXAMPLE 3

A master composition was prepared by dissolving 6.5 g of fumaric acid in a solution prepared from 50 ml of Dow Corning Z6032 as received, 42.5 ml of methanol, and 7.5 ml of water. A coating composition was prepared by mixing 25 ml of methanol with 75 ml of the master composition.

Three samples of 125 micron corona treated LDPE film were coated using the following compositions: LDPE sample I was coated using the coating composition described above; LDPE film sample II was coated using the coating composition described above to which was added 0.243 grams of benzoyl peroxide; LDPE film sample III was coated using the coating composition described above to which was added 0.243 grams of dicumyl peroxide.

Following coating, draining, and drying of the films, the samples were all subjected to 175 kV electron beam radiation. Film sample I received 5 Mrad, and film samples II and III received 7.5 Mrad.

The oxygen permeability of the films at about 70-80% relative humidity was determined, as before described. The results are described in Table I below.

TABLE I
The Effect of Added Peroxide on Oxygen Permeability

| Sample # | Permeability at about 70-80% R.H., cc $O_2/m^2$/24 hours |
|---|---|
| I | >50 |
| II | 12 |
| III | 15 |

Prior to the determination of oxygen permeability at 70-80% relative humidity, the film specimens were free of cracks and showed no crazing. Following the determination of oxygen permeability at 70-80% relative humidity, sample I cracked and showed craze. Samples II and III showed a much lesser degree of cracking and crazing after hydration.

While the mechanism by which the cracking and crazing of the coated films is reduced by the addition of a peroxide to the coating composition is not known, and without wishing to be bound by a particular theory, it is believed that the peroxide initiator is decomposed to free radicals by the electron beam radiation and the radicals then enhance the degree of polymerization of the unsaturated acid and the degree of cross-linking to the siloxane. This increases the strength of the polymer in the coatings. The hydrophilic groups in the polymer tend to absorb water; and the strength of the polymer coating in sample I is insufficient to prevent cracking caused by swelling resulting from the moisture absorption. Other tests have shown that additional 2.5 Megrads of eb radiation given to samples II and III were not important in reducing the hydrated film permeabilities.

In contrast, the polymer in the coating on samples II and III is stronger due to the enhanced degree of polymerization and cross-linking resulting from the addition of the peroxide to the coating composition. The added strength of the polymer coating allows it to resist the stress induced by the tendency of the hydrophilic material in the polymer coating to absorb water.

Other unsaturated carboxylic acids have also been found useful in the practice of the invention.

EXAMPLE 4

The experiment of Example 1 was repeated with 6.5 g of citraconic acid (another unsaturated carboxylic acid) added to the siloxane solution in place of the fumaric acid. The film to which the coating was applied and which was electron-beam polymerized as in Example 1, was a 125 $\mu m$ LDPE film.

At 0% relative humidity, the oxygen permeability in cc/$m^2$/24 hours was found to be 0.85; and under wet conditions at 80% RH, 43.0, greatly improved again from the dry 30cc/$m^2$/24 hours and wet 550cc/$m^2$/24 hours performance figures of the 100% silane monomer Z6032 alone.

EXAMPLE 5

The experiment of Example 3 was repeated with maleic acid substituted for the fumaric acid, again in the quantity of 6.5 g.

The resulting oxygen permeability at 0% relative humidity was found to be 1.5cc/$m^2$/24 hours, and 27.0cc/$m^2$/24 hours at 70-80% relative humidity.

EXAMPLE 6

The experiment of Example 3 was repeated utilizing itaconic acid in place of the fumaric acid. Remarkably, the oxygen permeability was less than 0.1 cc/$m^2$/24 hours at 0% relative humidity and only 21 cc/$m^2$/24 hours at 70-80% relative humidity.

A comparison of the relative oxygen permeability effects of the various added acids of Examples 1 and 2, 4, 5 and 6 was conducted as follows:

EXAMPLE 7

A master composition was prepared by dissolving 6.5 g of unsaturated acid in a solution containing 50 cc of Dow Corning Corporation Z6032 as received, 42.5ml of methanol, and 7.5 ml of water. The resulting master compositions were allowed to stand for at least 12 hours to allow hydrolysis, equilibration, and formation of oligomers. A coating composition was prepared by mixing 25 ml of methanol and 75 ml of the master composition and 0.243 g of benzoyl peroxide was dissolved in the solution which was then heated to 50° C. before it was applied to corona treated 125 micron LDPE film. The film was allowed to drain, dry and then subjected to a 7.5 Mrad dose of 175 kV electrons. The oxygen permeability at 0% and at about 70-80% relative humidity for compositions containing various unsaturated acids is shown below in Table II. The oxygen permeability was determined as before described.

TABLE II
Effect of Unsaturated Acid on Oxygen Permeability

| Added Acid | Permeability (cc $O_2/m^2/2$/24 hours) | |
|---|---|---|
| | 0% R.H. | About 70-80% R.H. |
| Fumaric | 1.9 | 38 |
| Maleic | 1.5 | 27 |
| Citraconic | 0.85 | 43.0 |
| Itaconic | <0.1 | 21.0 |

It is notable that itaconic and citraconic acids produce coating compositions that have lower "dry" oxygen permeabilities than coating compositions produced by maleic and fumaric acids. Although the reason for this is not known, and again without wishing to be bound to particular theories, it is believed that citraconic and itaconic acids produce compositions with better wetting properties than compositions containing maleic or fumaric acids. Because of the better wetting properties, it is believed that the coating composition wets the polymer film surface more completely and wicks more deeply into the pores of the film. Removal of the solvent by drying then results in a more complete closure of the pores of the film by the coating composition.

It has been found, moreoever, that the oxygen permeability of the coated film at about 70–80% relative humidity is affected by the quantity of unsaturated acid that is added to the coating composition. This is illustrated in Table III which follows Example 8. Itaconic acid was selected for testing because of the high solubility of the acid in the Z6032 siloxane film coating solution.

EXAMPLE 8

Effect of Increasing Quantities of Itaconic Acid on Oxygen Permeability at 70–80% Relative Humidity Coating compositions were prepared as follows. A master solution was prepared consisting of 50 ml of Dow Corning Z6032, 42.5 ml of methanol, and 7.5 ml of water. To 100 ml quantities of this solution was added 6.5 g, 9.75, 11.0 g, and 12.5 g of itaconic acid, respectively. The solutions were allowed to stand for at least 12 hours to allow hydrolysis, equilibration, and polymerization to oligomers. A coating composition was prepared by mixing 75 ml of each master solution with 25 ml of methanol. A quantity of either benzoyl peroxide or dicumyl peroxide was added to the coating composition which was then heated to 50° C., and a 125 micron corona treated LDPE film was immersed in the 50° C. solution. The film was allowed to drain and dry and then it was treated with a 7.5Mrad dose of 175 kV electrons. The data in Table III identifies the quantity of itaconic acid added to each 100 ml volume of the master solution, the identity and the quantity of peroxide added to the coating composition, and the oxygen permeability at about 70–80% R.H. of the LDPE sample treated with the coating composition after treating with the electron beam.

TABLE III

Effect of Quantity of Itaconic Acid on $O_2$ Permeability of Coated LDPE Films

| Quantity of Itaconic in the Master Composition (g.) | Name and Quantity of Peroxide in Coating Composition | $O_2$ Permeability at about 70–80% R.H. in (cc $O_2/m^2/24$ hrs) |
|---|---|---|
| 6.75 | Benzoyl Peroxide 0.253 g | 21.0 |
| 9.75 | Dicumyl Peroxide 0.366 g | 12.5 |
| 11.0 | Benzoyl Peroxide 0.413 g | 0.65 |
| 12.5 | Dicumyl Peroxide 0.469 g | approx.0.01 |

The data in Table III shows that the oxygen permeability of the coating at about 70–80% relative humidity decreases as the quantity of unsaturated acid in the coating composition increases. In all the examples of Table III, the quantity of benzoyl or dicumyl peroxide is 5% by weight of the unsaturated acid in the coating compositions.

Although the mechanism by which the oxygen permeability at elevated relative humidity decreases with increasing quantities of itaconic acid is not known, and once more without wishing to be limited to any particular theories, it is believed that as the quantity of itaconic acid increases, the "free volume" of the siloxane coating is decreased and the itaconic acid more completely cross-links the siloxane polymer, thereby preventing swelling in the presence of moisture.

It has further been found that where used, there is an optimum quantity of peroxide that should be included with the unsaturated acid. Quantities of peroxide both less than and greater than the optimum amount cause the oxygen permeability of the coating at about 70–80% relative humidity to increase. These data are illustrated by the results of the following Example 9.

EXAMPLE 9

The Effect of the Content of Dicumyl Peroxide on Oxygen Permeability

A master coating composition was prepared by adding 12.5 g of itaconic acid to a solution consisting of 50 ml of Dow Corning Corp. Z6032 as received, 42.5 ml of methanol, and 7.5 ml of water. The solution was allowed to stand for 12 hours at ambient room temperature to allow hydrolysis, equilibration, and polymerization to oligomers. Coating compositions were prepared by mixing 75 ml of the master composition with 25 ml of methanol, and adding dicumyl peroxide with stirring to cause it to dissolve. The oxygen permeability results described in Table IV were obtained from 125 micron LDPE corona treated samples which were immersed in the coating composition, allowed to drain and dry, and then treated with a 7.5 Mrad dose of 175 kV electrons utilizing the electron beam equipment previously described. The quantity of dicumyl peroxide described in Table IV is the actual amount used; and the number in parentheses is the quantity in percent by weight based on the weight of the unsaturated acid in the coating composition. The oxygen permeability was determined at about 70–80% R.H.

TABLE IV

Effect of Quantity of Dicumyl Peroxide on Oxygen Permeability

| Quantity of Dicumyl Peroxide, (g) | $O_2$ Permeability (cc/$m^2$/24 hours) at about 70–80% R.H. |
|---|---|
| 0.469 (5%) | 0.04 |
| 0.703 (7.5%) | approx. 0.0 |
| 0.938 (10.0%) | 0.25 |
| 1.172 (12.5%) | 30 |
| 1.406 (15%) | 40 |

Although the mechanism by which the oxygen permeability at elevated relative humidity is affected by the quantity of dicumyl peroxide included in the coating is not known, it is believed that the increasing quantities of dicumyl peroxide "overcure" or excessively cross-link the coating. The "overcuring" causes the coating to shrink; and the stresses caused by this appears to tear the base polyethylene film and opens new channels for oxygen permeation.

It has also been found that a decrease of oxygen permeability of LDPE film is affected by the thickness of the coating, as shown by Example 10.

EXAMPLE 10

The Effect of Coating Thickness on Oxygen Permeability at 70–80% Relative Humidity A master composition was prepared by dissolving 12.5 g of itaconic acid in a solution prepared by mixing 50 cc of Dow Corning Z6032 as received, 42.5 ml of methanol, and 7.5 ml of water. Variable coat weights were achieved by increased dilution of the master composition. Coating composition I was prepared by mixing 75 ml of the master composition with 25 ml of methanol. Coating composition II was prepared by mixing 62.5 ml of the master composition with 37.5 ml of methanol. Coating composition III was prepared by mixing 50 ml of the master composition with 50 ml of methanol. Prior to coating, a quantity of dicumyl peroxide equivalent of 7.5% by weight of the contained itaconic acid was dissolved in the coating composition.

The coating compositions were heated to 50° C., and corona-treated 125 micron LDPE was immersed in the composition and then allowed to drain and air dry. The coated films were then given a 7.5 Mrad dose of 175 kV electrons using the above-mentioned electron beam equipment. The oxygen permeability of the coated film samples is shown in Table V. The numbers in parentheses after the coating compositions in the table are the actual weights of dicumyl peroxide employed in each composition.

TABLE V

| Effect of Coating Weight on Oxygen Permeability at about 70-80% R.H. | | |
|---|---|---|
| Composition No. | Solution Concentration | Oxygen Permeability, (cc/m$^2$/24 hours) |
| I (0.703 g) | 15% | approx. 0 |
| II (0.586 g) | 12.5% | 4.6 |
| III (0.469 g) | 10% | 28.0 |

Although the mechanism by which increasing the coat weight of the siloxane coating containing itaconic acid decreases the oxygen permeability is again not entirely known, it is, however, believed that the amount of material remaining after evaporation of the solvent from coating compositions II and III is insufficient completely to cover the film surface and fill the pores of the film.

It has been discovered, furthermore, that mixtures of the unsaturated acids can be used in the coating compositions, an example of which is described in Example 11.

EXAMPLE 11

A master composition was prepared by dissolving 6.0 g of itaconic acid and 3.75 g of fumaric acid in a solution prepared by mixing 50 ml of Dow Corning Corp. Z6032 as received, 42.5 ml of methanol, and 7.5 ml of water. A coating composition was prepared by mixing 75 ml of the master composition with 25 ml of methanol. A total quantity of 0.488 g of benzoyl peroxide was dissolved in the coating composition and it was heated to 50° C. A piece of 125 micron LDPE film which had been corona treated on both sides was immersed in the coating composition, then allowed to drain and dry. It was then treated with a 5 Mrad dose of 175 kV electrons using the electron beam equipment previously described.

Thus far, experiments have been described with a preferred type Z6032 alkylaminotrialkoxy siloxane; but the invention may be practiced with other siloxanes, as well. Cohydrolysis of Z6032 with Dow Corning Corporation Z6020 [3-(2-aminoethyl) - aminopropyl trimethoxysilane]or Union Carbide Corp. A-1100 (gamma aminopropyltriethoxysilane), for example, forms aminosilane copolymers which also dissolve the unsaturated acids described hereinabove. In some instances, the solubility of the unsaturated acids is greater in the aminosilane copolymers than in the Z6032 polymer alone, as illustrated in the following example.

EXAMPLE 12

Copolymers of Z6032 and Z6020 Containing Dissolved Fumaric Acid

In the coating compositions described below, the molar ratio of Z6032:Z6020 was varied. Composition 1 had a molar ratio of 4:1, composition 2 had a molar ratio of 3:1, composition 3 had a molar ratio of 2:1, and composition 4 had a molar ratio of 1:1. The quantity of the Z6032/Z6020 mixture was adjusted so that the volume of silane in each composition was approximately equal. The Z6020 was neutralized using fumaric acid, and an additional quantity of 6.5 g (20%) of fumaric acid was added to each composition, an amount slightly below the solubility limit of 7.3 g (22%) of fumaric acid in Z6032, as described in Example 2. Thus, as the molar ratio of Z6032 to Z6020 decreased, the total quantity of fumaric acid in the composition increased.

TABLE VI

| Composition of Z6032/Z6020/Fumaric Acid Coatings | | | | | |
|---|---|---|---|---|---|
| Composition | Z6032 ml | Z6020 ml | Methanol ml | Water ml | Fumaric Acid g |
| 1 | 44.2 | 2.3 | 45.2 | 8.3 | 7.7 |
| 2 | 42.6 | 3.0 | 45.9 | 8.6 | 8.1 |
| 3 | 39.6 | 4.15 | 47.2 | 9.15 | 8.7 |
| 4 | 33.0 | 6.8 | 45.1 | 15.0 | 10.1 |

The compositions listed in Table VI above were diluted with an equal volume of methanol and a sample of corona treated 125 micrometer LDPE film was immersed in each diluted solution, allowed to drain, and then air dry. The coatings were polymerized and grafted to the film by subjecting them to a 5 Mrad dose of 175kV electrons utilizing the electron beam equipment described above. The coated films were clear and transparent with no evidence of haziness or crystal formation in the coating.

Another example of the use of other siloxanes follows:

EXAMPLE 13

Copolymer of Z6032 and A1100 Containing Itaconic Acid

A coating composition was prepared in which Z6032 and the before-mentioned A1100 were in equal molar amounts with the total volume of silane equal to about 20% by volume of the coating composition. The coating composition was prepared by mixing 7.2 ml of A1100, 32.0 ml of Z6032 as received, 45.7 cc of methanol, and 15.0 cc of water.

A total quantity of 19.0 g of itaconic acid was added and stirred to cause it to dissolve. The mixture was allowed to stand for 12 hours to cause it to hydrolyze, equilibrate, and condense to oligomers. A 100 ml portion of the coating composition was mixed with 100 ml of methanol and then heated to 50° C. A sample of 125 micron LDPE film was immersed in the solution and allowed to drain and air dry. The coated film was clear and transparent with no haziness or signs of crystal formations.

While, as previously mentioned, improved surface tension and thus adhesion properties are also attainable with the techniques of the invention, emphasis has thus far been placed in the discussion of examples of the carboxylic acid addition to the siloxane coating material for the oxygen or gas impermeability improvement properties. Turning now, therefore, to the improved results found with such carboxylic acid addition in terms of increased surface tension and adhesion properties, the following has been determined. There are two different types of polymerization taking place in accordance with the technique of the invention. One is the condensation polymerization which forms the Si—O—Si, cross linking, with the evolution of water; and the other one is the cross linking and the grafting by the free radical polymerization initiated by the electron beam or other radiation sources such as UV, gamma rays and the like.

EXAMPLE 14

The critical surface tension of the before-described electron beam-grafted siloxane coating without the additional fumaric acid was measured to be 54 dynes per centimeter and was not wettable by tap water. The critical surface tension of the siloxane coating containing fumaric acid as described in Example 1, was greater than 60 dynes per centimeter, and it was, in fact, easily wetted by tap water.

The critical surface tensions, indeed, of the coated films described in Table II of Example 7 were all over 60 dynes/cm. The films were all easily wetted by tap water.

EXAMPLE 15

A master composition was prepared by mixing 50 ml of Dow Corning Corp. Z6032, as received, with 42.5 ml of methanol and 7.5 ml of water. The mixture was allowed to stand for 12 hours to allow it to hydrolyze, equilibrate, and polymerize to oligomers.

A coating composition was prepared by mixing 50 ml of the master composition with 50 ml of methanol and to this was added 12 grams of acrylamide, and the solution was warmed to 50° C. A sample of corona treated 125 micron LDPE film was immersed in the solution, allowed to drain and air dry. The coated film was then treated with a 5 Mrad dose of a 175 kV electron beam. The grafted coating was very hydrophilic and easily wet with tap water.

As previously noted in the before-mentioned U.S. Pat. No. 4,803,126, the surface of polymers such as polyolefin and the like was found to be improved in terms of wettability by barrier and other coatings and to enhance interlayer adhesion by graft polymerization through intiation by electron beam radiation. In that patent, the polyolefin or other polymer films were primed with a silane polymer material and electron beam irradiated, it being pointed out that the irradiation appeared to generate free radicals from the film that in turn initiated further polymerization of the silane and grafted the same to the film surface. The process was described as having been found to increase the surface tension of the film surface, rendering the same compatible for strong bonding with barrier materials, such as acrylonitrile and similar monomers for producing further layers on the film substrate or for improved wetting by decorative or protective inks or coatings.

We have now found that the siloxane coating containing the carboxylic acid also provides superior adhesion of barrier polymers compared with just corona treated film, and in fact the presence of the carboxylic groups on the surface provide higher critical surface tension and improve the wetting of the polymer surface by polymer latices, such as a polyvinylidine dichloride latex or a polyvinylacetate latex.

Clearly other organic or inorganic barrier layers may also be applied, taking advantage of this increased surface tension and thus adhesion properties, apparently created by the increased number of carboxylic groups created by the modified siloxane. This has enabled metals, such as aluminum, to be strongly adherable onto the surface of the polyolefin or other film, as set forth in the following example.

EXAMPLE 16

Solution I was prepared by taking 50 cc of as received Z6032 to which 42.5 cc of methanol and 7.5 cc of water was added. The mixture was then allowed to stand for 12 hours at ambient conditions to equilibrate and condense into low molecular weight polymers. Solution II was prepared by taking 50 cc of as received Z6032 to which 42.5 cc of methanol was added and 7.5cc of water. 6.25g of fumaric acid was then added and the solution was left overnight (approximately 12 hours). Four biaxially oriented polypropylene films, 17 micron thick, were used.

Film I as received.

Film II was corona treated.

Film III was corona treated and immersed in solution I which had been reduced to half strength by mixing with an equal volume of methanol. It was then drained of excess solution, air dried, and treated with electron beam at 175 kV and 5 Mrads.

Film IV was corona treated and then immersed in solution II which also had been reduced to half strength by mixing it with equal volume of methanol. It was then drained of the excess solution, air dried, and then treated with 175 kV and 5 Mrad electron beam.

All four films were then vacuum metallized with evaporated aluminum using an experimental bell jar apparatus. After the metallization, the adhesion of the aluminum metal onto the biaxially oriented polypropylene film was tested using a "Scotch tape-test", with metal being removed under such test of films I and III, and being affixed without removal for films II and IV.

Thus, the fumaric acid or other carboxylic acid-modified siloxane coating of the invention may be used for a wide range of different types of barrier layers, all taking advantage of the high surface tension adhesion effects of this part of the invention.

Again, not wishing to be bound to particular theories, it being sufficient to describe the invention as it has been found to work in practice, the following may be an explanation of this increased surface tension and adhesion effect.

It is believed that the first atoms of metal, such as the aluminum, arriving at the surface of the fumaric acid-modified siloxane (or other carboxylic acid-modified) film, react with the carboxylic acid groups to form a metal salt, such as an aluminum salt, which then acts as an adhesion-promoting layer between the fumaric acid-modified siloxane coating and the aluminum metal vacuum deposited on top of the aluminum salts.

We have also found that the addition of other materials, for example acrylamide, prior to grafting and polymerization of the siloxane coating containing acrylic acid, will also provide layers which produce substantially improved adhesion of vacuum evaporated aluminum onto the siloxane surface.

While experiments with rendering LDPE polymer films oxygen impermeable (and/or of increased surface tension and wettability) have been heretofore described, the invention is applicable, as explained in said patent and copending applications and earlier herein, with other types of organic polymer films as well, including polyolefins such as polypropylene, polyester, polyvinylidene dichloride, ethylene vinyl alcohol copolymers, acrylonitrile polymers and amorphous nylon.

EXAMPLE 17

A master composition was prepared by dissolving 8.1 lg of itaconic acid in a solution consisting of 50 cc of Dow Corning Corporation Z6032 as received, 7.5 cc of water, and 42.5 cc of methanol. The solution was allowed to stand for 12 hours to hydrolyze and equilibrate. A coting composition was prepared by mixing 75 cc of the master composition and 25 cc of methanol. To this solution was added 0.304 grams of benzoyl peroxide and it was heated and stirred to cause the benzoyl peroxide to dissolve.

A corona-treated specimen of an ethylene-propylene copolymer film was immersed in the coating solution and then allowed to drain and air dry. It was treated with a 7.5 Megarad dose of 175 KV electrons utilizing the above-mentioned electron beam equipment.

The oxygen permeability was measured at 28 cc/square meter/24 hours at 70–80% relative humidity.

As still another illustration, from a master solution utilizing 50 cc of Z6032, 42.5 cc of methanol, 7.5 cc of water and 12.5 grams of itaconic acid, a coating solution of 75 cc of the above with 25 cc of methanol may be prepared, with 0.703 grams of dicumyl peroxide to coat any one of biaxially oriented polypropylene, cast polypropylene, low density polyethylene and polyester films. Following coating and drying, the films may be subjected to electron beam radiation by the previously described 5 megarad dose of 175 kV electrons to provide oxygen impermeability performance.

As is evident from the above, the invention also provides a technique for controlling, in effect, the degree of impermeability to oxygen or other gases, and/or the degree of wettability and adhesion properties of organic polymer films and the like through variation in the quantity of carboxylic acid added in the siloxane solution.

A novel adhesion promoter has also been evolved comprising a mix of the silane and carboxylic acid(s) which can be supplied as such; and/or an impermeability-imparting coating solution of the hydrolyzed silane and carboxylic acid mixture may also be supplied. Carboxylic acid precursors may in some cases be substituted for the carboxylic acid, including nitriles, carboxylic esters and carboxylic anhydrides, among others. And, as before stated, other types of radiation than the preferred electron-beam radiation and other well-known chemical initiation and grafting techniques may, if desired, be used.

Further modifications will also occur to those skilled in this art, such being considered to fall within the spirit and scope of the invention as defined in the appended claims.

What is claimed is:

1. A method of controlling the impermeability of an organic polymer film to gases that comprises, mixing a siloxane monomer with ethylenically unsaturated carboxylic acid in a solvent and solubilizing, hydrolyzing and equilibrating the solution; coating the solution upon the polymer film; evaporating the solvent to complete the formation of Si-0-Si bonds; and polymerizing and grafting the coating to the polymer film.

2. A method as claimed in claim 1 and in which the carboxylic acid is mixed before or after the hydrolyzing.

3. A method as claimed in claim 1 and in which the solvent comprises an alcohol.

4. A method as claimed in claim 1 and in which the polymerizing and grafting is effected by irradiating the coating.

5. A method as claimed in claim 4 and in which the irradiation is effected by electron-beam radiation.

6. A method as claimed in claim 1 and in which the quantity of carboxylic acid is adjusted to set the desired degree of gas impermeability of the resulting polymerized and grafted coating.

7. A method as claimed in claim 1 and in which the carboxylic acid is selected from the group consisting of fumaric, citraconic, maleic and itaconic acids and combinations of the same.

8. A method as claimed in claim 1 and in which the carboxylic acid comprises one of itaconic and fumaric acid and the percentage by volume of itaconic and fumaric acid in the said solution lies within the ranges of from a few percent to the respective maximum percentages of total solubility in the said solution of the order of 41% and 22%.

9. A method as claimed in claim 8 and in which the quantity of itaconic or fumaric acid is increased beyond said respective maximum percentages and the degree of gas impermeability further lowered by dissolving in said solution a different siloxane mixed with additional carboxylic acid.

10. A method as claimed in claim 1 and in which the polymer film is selected from the group consisting of polyethylene, polypropylene, polyester, polyvinylidene dichloride, ethylene vinyl alcohol copolymers, acrylonitrile polymers and amorphous nylon.

11. A method of controlling the wettability, surface tension and adhesion properties of an organic polymer film, that comprises, mixing a siloxane monomer in a solvent with ethylenically unsaturated carboxylic acid; solubilizing, hydrolyzing, and equilibrating the solution; coating the solution upon the polymer film; evaporating the solvent to complete the formation of the Si—O—Si bonds; and polymerizing and grafting the siloxane and carboxylic acid to the polymer film.

12. A method as claimed in claim 11 and in which the polymerizing and grafting is effected by irradiating with electron beam radiation.

13. A method as claimed in claim 12 and in which the quantity of acid is adjusted to control the desired degree of wettabilit and adhesion properties of the resulting electron-beam-irradiated coating.

14. A method as claimed in claim 13 and in which an inorganic or organic barrier layer is adhered to the irradiated coating.

15. A method as claimed in claim 13 and in which the barrier layer is a vacuum evaporated metal layer.

16. A method of increasing one or both of the wetting-surface tension-adhesion properties and the oxygen impermeability of an organic polymer film, that comprises, dissolving an ethylenically unsaturated carboxylic acid in a solution containing a hydrolyzed siloxane monomer; coating the solution upon the polymer film; evaporating the solution in the air to expose carboxyl groups at the siloxane coating-air interface; and electron-beam irradiating the coating to effect grafting of the siloxane to the polymer surface and to the carboxyl groups.

17. A method as claimed in claim 16 and in which the carboxylic acid is selected from the group consisting of fumaric, citraconic, maleic and itaconic acids and combinations of the same.

18. A method as claimed in claim 16 and in which the carboxylic acid is mixed with the siloxane prior to hydrolyzing.

19. A method as claimed in claim 16 and in which the carboxylic acid is added after hydrolyzing the siloxane.

20. A method as claimed in claim 5 and in which a free radical initiator is added to the solution before coating.

21. A method as claimed in claim 20 and in which the free radical initiator is a peroxide.

22. A method as claimed in claim 21 and in which the quantity of said peroxide is varied to vary said impermeability.

23. A method as claimed in claim 1 and in which the weight of the coating is varied to vary the said impermeability.

24. An organic polymerized siloxane-carboxylic acid coated polymer film impermeable to gases and which is formed by the method of claim 1.

25. An organic polymerized siloxane-carboxylic acid coated polymer film of improved wettability, surface tension and adhesion properties and which is formed by the method of claim 11.

26. An organic polymerized siloxane-carboxylic acid coated polymer film as claimed in claim 25 and in which an inorganic or organic barrier layer is adhered to the polymerized coating.

27. An organic polymerized siloxane-carboxylic acid coated polymer film as claimed in claim 26 and in which the barrier layer is a vacuum evaporated metal layer.

28. An organic polymerized siloxane-carboxylic acid coated polymer film as claimed in claim 27 and in which said metal is aluminum.

29. An organic polymer film of one or both of increased wetting-surface tension-adhesion properties and oxygen impermeability, having a coating of a hydrolyzed siloxane monomer combined with an ethylenically unsaturated carboxylic acid or a precursor thereof evaporated to expose carboxyl groups at the siloxane coating-air interface, and with the siloxane grafted to the polymer surface and to the carboxyl groups.

30. An organic polymer film as claimed in claim 29 and in which the carboxylic acid is selected from the group consisting of fumaric, citraconic, maleic and itaconic acid and combinations of the same and in which the polymer film is selected from the group consisting of polyethylene, polypropylene, polyester, polyvinylidene dichloride, ethylene-vinyl alcohol copolymers, acrylonitrile polymers and amorphous nylon.

31. An organic polymer film as claimed in claim 29 and in which an organic or inorganic, barrier layer is adhered to the polymerized and grafted coating of the polymer film.

32. An organic polymer film as claimed in claim 29 and in which the percentage by volume of the carboxylic acid in the hydrolyzed siloxane monomer lies within the range of from a few percent to the maximum percentage of total solubility thereof.

* * * * *